Sept. 27, 1966   B. S. JACKSON   3,274,675
STRAIGHT AND CURVED BEARING PULLER
Filed Sept. 4, 1964   2 Sheets-Sheet 1

Beal S. Jackson
INVENTOR.

BY 
Attorneys

Sept. 27, 1966  B. S. JACKSON  3,274,675
STRAIGHT AND CURVED BEARING PULLER
Filed Sept. 4, 1964  2 Sheets-Sheet 2
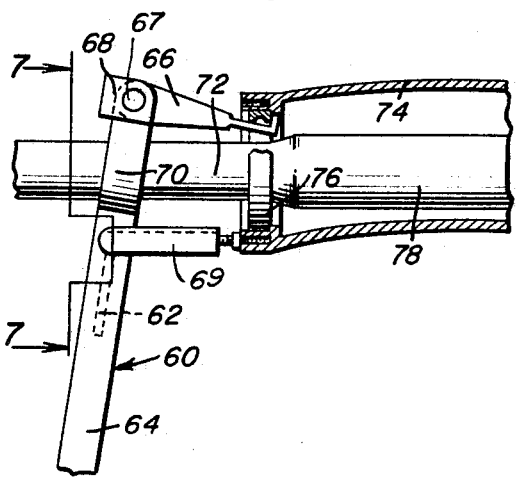
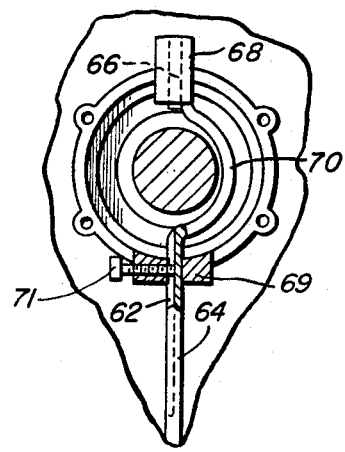
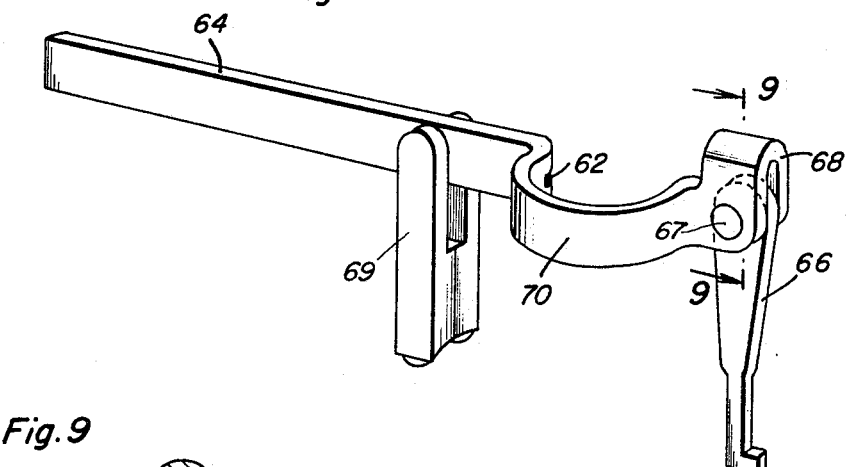
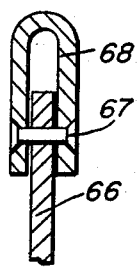
Beal S. Jackson
INVENTOR.

United States Patent Office 3,274,675
Patented Sept. 27, 1966

3,274,675
STRAIGHT AND CURVED BEARING PULLER
Beal S. Jackson, Rte. 10, Tulia, Tex.
Filed Sept. 4, 1964, Ser. No. 394,416
5 Claims. (Cl. 29—267)

This invention relates to a novel and useful bearing puller and more specifically to a bearing puller primarily designed to engage effect a pulling force on a bearing race in order that the latter may be withdrawn from within an axle housing or the like.

The bearing puller of the instant invention includes an elognated lever and a pull arm is pivotally secured at one end to a first end of the lever for rotation about an axis extending transversely of the lever and the arm with the other end of the arm including a laterally projecting portion adapted to engage a bearing race through which the adjacent end of the arm is passed. A fulcrum member is carried on the elongated lever and projects laterally outwardly therefrom and is disposed in the plane of swinging movement of the pull arm relative to the lever. The fulcrum and lever include coacting means which mount the fulcrum on the lever for longitudinal sliding movement along the latter and for pivotal movement relative to the lever about an axis generally paralleling the axis of rotation of the pull arm. By providing a tool of this type the laterally projecting end portion of the pull arm may be passed through a bearing race and engaged therewith while the outermost end of the fulcrum or fulcrum member supported from the lever may be engaged with the outer end of the associated axle housing. In this manner, a push on the end of the lever remote from the pull arm toward the inner end of the axle housing will effect an outward pull on the bearing race disposed within the axle housing.

The main object of this invention is to provide a bearing puller of the type hereinbefore set forth and including structural features which particularly well adapt it for use as an axle bearing race puller.

Another object of this invention is to provide a bearing puller including means by which the effective extent of the fulcrum member laterally outwardly of the lever to which the fulcrum member is pivotally secured may be adjusted as desired.

A final object of this invention to be specifically enumerated herein is to provide a bearing puller in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a side elevational view smaller to that of FIGURE 1 but showing a modified form of bearing puller;

FIGURE 7 is a fragmentary sectional view taken substantially upon the plane indicated by the section line 7—7 of FIGURE 6;

FIGURE 8 is a perspective view of the modified form of bearing puller; and

FIGURE 9 is an enlarged fragmentary sectional view taken substantially upon the plane indicated by the section line 9—9 of FIGURE 8.

Figure 1:
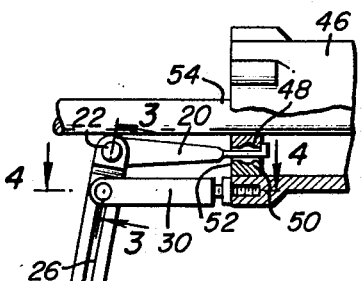
FIGURE 1 is a side elevational view of the bearing puller of the instant invention shown in position in relation to an axle housing and axle bearing for the purpose of pulling the inner bearing race outwardly of the axle housing, parts of the axle housing and axle bearing being broken away and shown in section.
Figure 2:
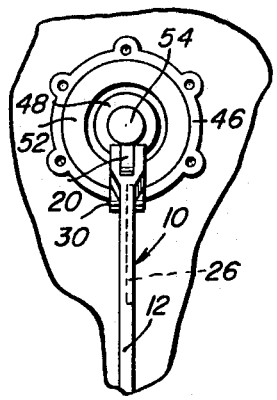
FIGURE 2 is an end elevational view of the embodiment illustrated in FIGURE 1 and as seen from the left side of FIGURE 1.
Figure 3:
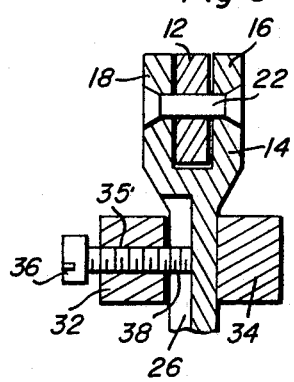
FIGURE 3 is a fragmentary enlarged sectional view taken substantially upon the plane indicated by the section line 3—3 of FIGURE 1.
Figure 4:
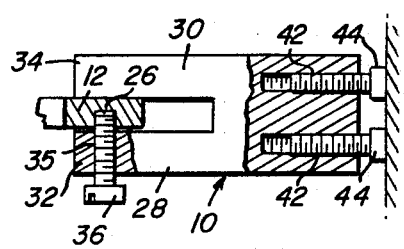
FIGURE 4 is a fragmentary enlarged sectional view taken substantially upon the plane indicated by the section line 4—4 of FIGURE 1.
Figure 5:
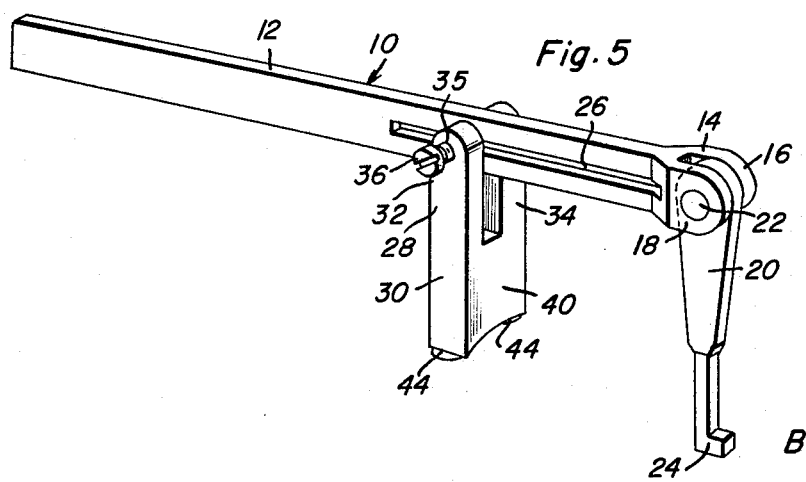
FIGURE 5 is a perspective view of the bearing puller.
Figure 5:

Referring now more specifically to the drawings the numeral 10 generally designates the bearing puller of the instant invention. The puller 10 includes an elongated lever 12 including a bifurcated end portion 14 at one end between whose furcations 16 and 18 one end of a pull arm 20 is pivotally secured by means of a pivot fastener 22. The free end of the pull arm 20 includes a laterally directed bearing race engaging end portion 24.

One side of the end portion of the lever 12 to which the pull arm 20 is secured is longitudinally slotted as at 26 and a bifurcated end 28 of an elongated fulcrum panel member 30 slidably receives the lever 12 between its furcations 32 and 34. The furcations 32 has a threaded bore 35 formed therethrough and a setscrew 36 is threadedly engaged in the bore 35 and includes an inner end portion 38 which is slidably received in the slot 26. The setscrew 36 functions as a pivot fastener and as a slide follower to slidably and pivotally support the fulcrum panel member 30 from the lever 12. In addition, the setscrew 36 may be tightened so as to clampingly engage the lever 12 between the inner end portion 38 and the furcation 34 so as to adjustably position the fulcrum panel member 30 longitudinally of the lever 12, it being understood that relative pivotal movement may still occur between the fulcrum panel member 30 and the lever 12 when the setscrew 36 is tightened.

The fulcrum panel member 30 is dished as at 40 on one side face and the free end of the fulcrum panel member 30 has a plurality of threaded blind bores 42 formed therein in which a pair of adjustment screws 44 are threadedly engaged.

In operation, the free end of the fulcrum panel member 30 may be abutted against the outboard end of an axle housing 46 as shown in FIGURE 1 of the drawings with the free end of the pull arm 20 passed between the inner and outer races 48 and 50 of the bearing assembly 52 for the axle member 54 disposed in the axle housing 46. The laterally directed end portion 24 of the pull arm 20 may be engaged with the inner face of the inner race 48 and by striking the end of the lever 12 remote from the pull arm 20 with an impact tool 56 a sharp outward pull will be applied on the inner race 48. Of course, the outer race 50 may be engaged by the laterally directed end portion 24 by sliding the fulcrum panel member 30 to the end of the slot 56 remote from the pull arm 20 if the axle member 54 has first been removed. In this manner, the laterally directed end portion 24 may be engaged with the outer race 50 diametrically opposite the point at which the end portion 24 is engaged with the inner race 48 shown in FIGURE 1 of the drawings.

With attention now directed more specifically to FIGURES 6–9 of the drawings there will be seen a modified form of bearing race puller generally referred to by the ference numeral 60 and which is substantially identical to the bearing race puller 10 with the execption that the slot 62 formed in the lever 64 thereof and corresponding to the slot 26 is spaced from the end portion of the lever 64 to which the pull arm 66, corresponding to the pull arm 20, is pivotally secured by means of a pivot fastener 67, the fulcrum panel member 69, corresponding to the member 30, being pivotally secured to the lever 64 by means of a setscrew 71 corresponding to setscrew 35 and including an inner end slidably received in slot 62. In addition, the portion of the lever 64 disposed between the bifurcated end portion 68 thereof and the slot 62 is bowed as at 70 so as to be adapted to encircle the axle 72 within the axle housing 74 when it is desired to pull the outer race 76 from the housing 74 while the axle 78 is disposed within the housing 74. Otherwise, the operation of the bearing puller 60 is substantially identical to the bearing puller 10.

The foregoing is considered as illustrative only of the principles of the invention. Further, since numerous modifications and changes will readily occur to those skilled in the art, it is not desired to limit the invention to the exact construction and operaion shown and described, and accordingly, all suiable modifications and equivalents may be resorted to, falling within the scope of the invention as claimed.

What is claimed as new is as follows:

1. A bearing puller comprising an elongated lever, a pull arm pivotally secured at one end to a first end of said lever for rotation about an axis extending transversely of said lever and arm, the other end of said arm including means adapted to engage a bearing race through which said other end of said arm is received, an elongated fulcrum member carried on a mid-portion of said elongated lever and projecting laterally outwardly therefrom and disposed in the plane of swinging movement of said pull arm, said lever and fulcrum member including coacting means defining a pivot connection between said lever and said fulcrum member for swinging movement of the free end of said fulcrum member relative to said lever through a plane substantially coinciding with the first-mentioned plane, said coacting means also including means operative to shift said pivot connection longitudinally of said lever.

2. A bearing puller comprising an elongated lever, a pull arm pivotally secured at one end to a first end of said lever for rotation about an axis extending transversely of said lever and arm, the other end of said arm including a laterally projecting portion adapted to engage a bearing race through which said other end of said arm is received, a fulcrum member carried on a mid-portion of said elongated lever and projecting laterally outwardly therefrom and disposed in the plane of swinging movement of said pull arm, said lever and fulcrum member including coacting means mounting said fulcrum member on said lever for longitudinal sliding movement therealong and swinging movement relative thereto through a plane substantially coinciding with the first-mentioned plane, said lever, between said pull arm and said fulcrum member being bowed so as to be adapted to partially encircle an axle shaft extending through said race.

3. A bearing puller comprising an elongated lever, a pull arm pivotally secured at one end to a first end of said lever for rotation about an axis extending transversely of said lever and arm, the other end of said arm including a laterally projecting portion adapted to engage a bearing race through which said other end of said arm is received, a fulcrum member carried on a mid-portion of said elongated lever and projecting laterally outwardly therefrom and disposed in the plane of swinging movement of said pull arm, said lever and fulcrum member including coacting means mounting said fulcrum member on said lever for longitudinal sliding movement therealong and swinging movement relative thereto through a plane substantially coinciding with the first-mentioned plane, said pivot connection being defined by a longitudinal slot formed in said lever mid-portion, a bifurcated end portion on said fulcrum member slidably receiving said mid-portion between its furcations, and a setscrew threadedly engaged through one of said furcations and including an inner end portion slidably received in said slot.

4. The combination of claim 1 wherein said coacting means further includes means operative to releasably lock said pivot connection in adjusted position longitudinally of said lever, while still affording for swinging movement of said fulcrum member relative to said lever.

5. The combination of claim 1 wherein said coacting means includes a longitudinal slot formed in said lever mid-portion, a bifurcated end portion on said fulcrum member slidably receiving said mid-portion between its furcations, and a setscrew threadedly engaged through one of said furcations and including an inner end portion slidably received in said slot, said slot being blind and defining a groove formed in and extending along only one side of said lever.

References Cited by the Examiner

UNITED STATES PATENTS

| | | | |
|---|---|---|---|
| 1,151,712 | 8/1915 | Phillips | 29—267 |
| 2,710,520 | 6/1955 | Selzler et al. | 29—267 X |
| 2,995,340 | 8/1961 | Richardson | 29—267 X |
| 3,050,841 | 8/1962 | Esselstyn | 29—268 |
| 3,088,199 | 5/1963 | Lewis | 29—221.5 |

WILLIAM FELDMAN, *Primary Examiner.*

EDWARD C. ALLEN, MYRON C. KRUSE, *Examiners.*